(12) United States Patent
Zagone

(10) Patent No.: US 7,474,954 B1
(45) Date of Patent: Jan. 6, 2009

(54) EGR DIFFERENTIAL PRESSURE SENSOR AUTO CALIBRATION METHOD

(75) Inventor: Peter Zagone, Huntington, MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 11/843,853

(22) Filed: Aug. 23, 2007

(51) Int. Cl.
  *B60T 7/12* (2006.01)
  *F02M 25/07* (2006.01)

(52) U.S. Cl. ............ 701/108; 123/568.11; 123/568.22; 73/114.74

(58) Field of Classification Search ........... 701/101, 701/108, 114, 115; 123/568.11, 568.12, 123/568.21, 568.22, 568.16; 73/114.69, 73/114.74, 114.76
See application file for complete search history.

(56) References Cited

U.S. PATENT DOCUMENTS

| | | | |
|---|---|---|---|
| 6,360,541 B2 | 3/2002 | Waszkiewicz et al. | |
| 6,363,922 B1 * | 4/2002 | Romzek et al. | 123/568.16 |
| 6,401,457 B1 | 6/2002 | Wang et al. | |
| 6,424,906 B1 | 7/2002 | Zhu et al. | |
| 6,925,804 B2 | 8/2005 | Longnecker et al. | |
| 2008/0010975 A1 * | 1/2008 | Zhang et al. | 60/277 |
| 2008/0040014 A1 * | 2/2008 | Yahata et al. | 701/99 |

* cited by examiner

*Primary Examiner*—John T Kwon
(74) *Attorney, Agent, or Firm*—Bill C. Panagos; Rader, Fishman & Grauer PLLC

(57) ABSTRACT

A method for operating an electronic controlled internal combustion engine with an electronic control unit (ECU) having at least nonvolatile memory and tables resident therein to automatically recalibrate an exhaust gas recirculation (EGR) differential pressure sensor.

15 Claims, 2 Drawing Sheets

EGR DIFFERENTIAL PRESSURE SENSOR AUTO CALIBRATION METHOD

BACKGROUND OF THE INVENTION

One method for calculating the amount of mass flow of exhaust gas recirculation (EGR) in a diesel engine is to measure the differential pressure across a mechanical device. Certain of these devices will generate a differential pressure that is proportional to the volumetric flow (in volume per unit of time), such as a verturi. By measuring the temperature and pressure of this flow, this volumetric flow can be converted to a mass flow. An EGR differential pressure sensor (EGR DPS) has been designed to this purpose. This is a sensor that measures the differential pressure across this device and provides a voltage signal that is proportional to this pressure.

Due to the extreme environment created by heavy duty diesel engine EGR, output drift can be a problem with the EGR DPS. Output drift is the situation where the output of the sensor deviates from its calibrated value. Often the drift over the entire sensor calibration range can be tracked by recording the amount of sensor error with no pressure applied. In addition, if this error is large enough it can be determined that the sensor is defective.

1. Field of the Invention

The present invention relates to a method to auto calibrate an exhaust gas recirculation differential pressure sensor to correct for sensor output drift.

2. Description of the Related Art

A method for controlling an internal combustion engine having a variable geometry turbocharger (VGT) and an exhaust gas recirculation (EGR) system in the face of sensor failures and mechanical faults includes generating accurate substitute values for use by the engine control logic when EGR and VGT system-related sensors are diagnosed as having failed during operation, and maintaining controlled performance of the VGT system in the face of sensor failures or mechanical faults associated with the EGR or VGT system.

A closed-loop actuator control system includes a single PI controller for controlling one or more actuators to minimize an error between an engine operating parameter value and a reference parameter value. In multiple actuator systems, the control system of the present invention is operable to drive one actuator to its upper limit before transferring control to the next actuator. The proportional gain block of the PI controller preferably includes a bumpless gain feature operable to limit the rate of change of the proportional gain to thereby provide smooth gain scheduling. A feed forward block may optionally be included that preferably includes the bumpless gain feature. The actuator control system further includes anti-windup logic operable to disable the PI integrator if the actuator drive signal is upper or lower limit bounded and the error signal is greater or less than zero respectively, thereby creating dynamic saturation of the PI integrator.

A system for estimating turbocharger compressor outlet temperature includes an engine controller responsive to any two of corrected turbocharger speed, corrected fresh mass air flow and turbocharger compressor pressure ratio (compressor outlet pressure/compressor inlet pressure) to compute compressor outlet temperature based on a corresponding compressor outlet temperature model.

An exhaust gas recirculation (EGR) system for an engine with a variable geometry turbocharger (18) incorporates a master rotary electric actuator (REA) (50) with a microprocessor controller (53) receiving condition signals (46, 48a-e) from sensors (48) associated with the turbocharger and the engine control unit (ECU) (54) and positioning the turbine inlet nozzle (44) geometry of the turbocharger in response to a predetermined matrix of the condition signals. A slave REA (52) is connected through an internal processing unit (58) to the controller to position an EGR valve (34). The processing unit provides an actual position signal to the controller which responds with a desired position signal based on the predetermined condition signal matrix. The processing unit engages the slave REA to position the EGR valve.

BRIEF SUMMARY OF THE INVENTION

The present invention is directed to a method for operating an electronic controlled internal combustion engine with an electronic control unit (ECU) having at least nonvolatile memory and tables resident therein to automatically recalibrate an exhaust gas recirculation (EGR) differential pressure sensor. The method includes determining whether a drivecycle is completed; simultaneously determining engine status, EGR differential pressure sensor status, engine coolant temperature; determining actual zero offset by observing EGR differential pressure sensor output; determining whether actual zero offset is within acceptable limits; and storing the actual zero offset in nonvolatile memory. The method may also optionally include the step of determining whether engine shut down protection and idle shut down programs are operating. In addition, there is no auto calibration of the EGR differential pressure sensor, a fault is logged, actuating a warning alert and storing a nominal zero offset in nonvolatile memory when said actual zero offset is outside predetermined calibratable acceptable limits. Moreover, there is no auto calibration of said EGR differential pressure sensor if at least one of EGR differential pressure sensor is not enabled or is fixed, engine speed is not zero, engine speed has not gone from non zero to zero, the engine has not been running longer than a preset time, engine protection shutdown is operating or engine idle shutdown is operating.

The drive cycle is determined by an ignition stature going from on to off. The EGR status is determining whether said EGR differential pressure sensor is enabled and whether said EGR differential pressure sensor is not fixed. The engine status includes simultaneously determining whether said engine has run a predetermined calibratable period of time; whether engine speed has gone from non zero to zero, and whether engine speed remains zero for a predetermined calibratable period of time.

In practice, the EGR differential pressure sensor auto calibration occurs if sensor deficit is repeatable after a predetermined number of checks. The method further includes setting a counter in said ECU for debouncing EGR leak fault until said faults occur for a predetermined number of times. Preferably, auto calibrating the EGR differential pressure sensor occurs at said drive cycle end. The method may also include performing auto calibration of said EGR differential pressure sensor when engine ignition is on if auto calibration is enabled, auto calibration at ignition off is disabled, engine speed is zero, coolant temperature is greater than an auto calibrated minimum coolant temperature and said EGR differential pressure sensor is not failed.

The method may further include logging a fault that remains active during current and subsequent drive cycles until a successful auto calibration of said EGR differential Pressure Sensor occurs. The method may further include auto calibrating said EGR Differential Pressure Sensor in response to a command from a service tool when said ignition is on, a command is reviewed by the ECU from a service tool to an auto calibrate said EGR differential pressure sensor engine speed is zero and said EGR differential pressure sensor has not failed.

The method may further include determining whether EGR differential pressure sensor voltages are within a differential pressure zero minimum and a differential pressure maximum to compute the EGR differential pressure.

The method may further include generating an active fault, shutting off EGR engine operation mode and setting the EGR differential pressure sensor error back to zero when the differential pressure counts are outside a differential pressure zero minimum and differential pressure zero maximum range.

The method may further include operating the engine in boost mode when a fault is logged.

DETAILED DESCRIPTION OF A PREFERRED EMBODIMENT(S)

Figure 1:
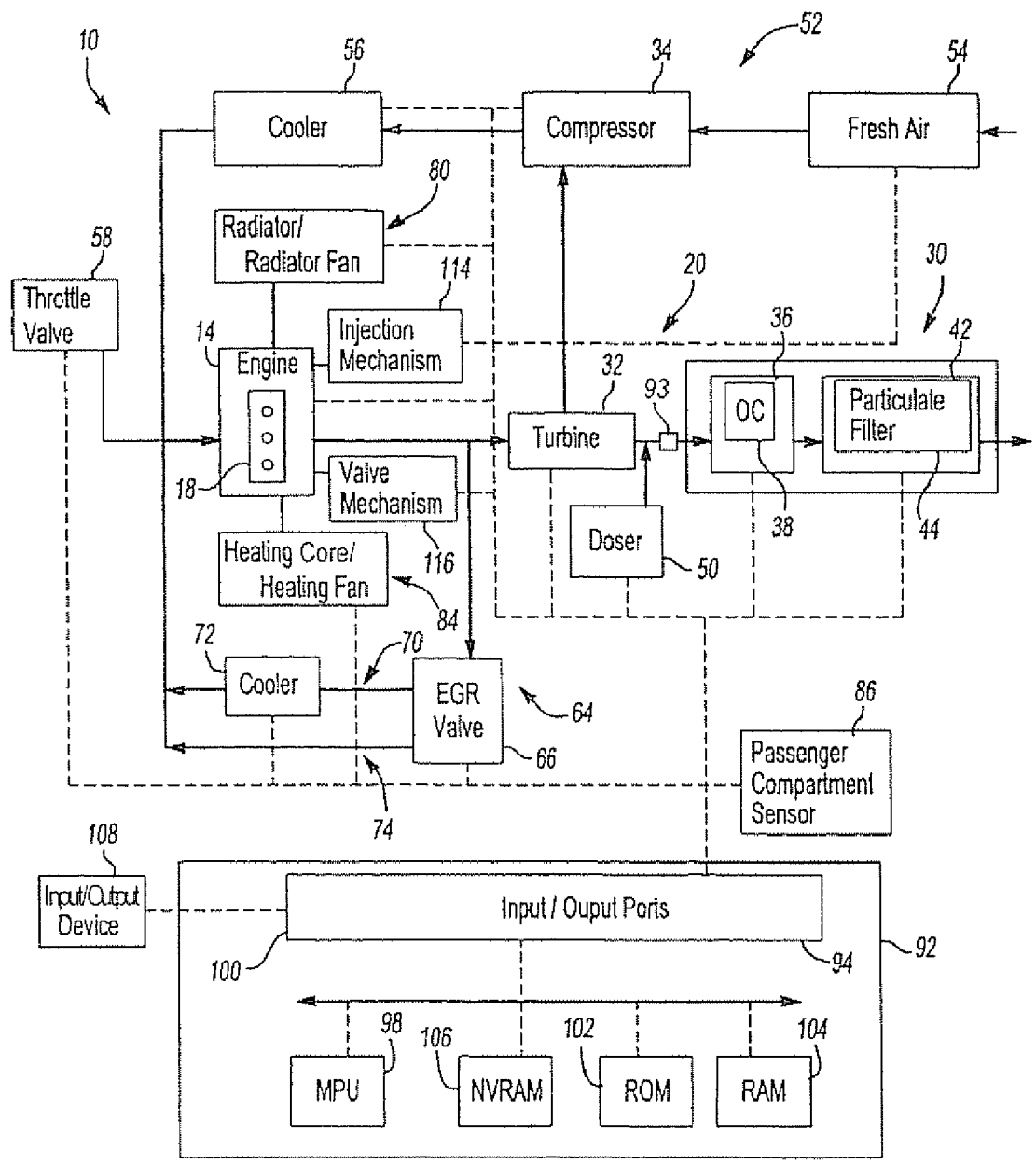
FIG. 1 is a schematic representation of an electronic controlled internal combustion engine having an electronic controller with at least non volatile memory.

With reference to FIG. 1, an internal combustion engine and associated control systems and subsystems are generally indicated at 10. System 10 includes an engine 12 having a plurality of cylinders, each fed by a fuel injector. In a preferred embodiment, engine 12 is a compression-ignition internal combustion engine, such as a heavy duty diesel engine. The injectors receive pressurized fuel from a fuel supply in a known manner. Various sensors are in electrical communication with a controller 22 via input ports 38. Controller 22 preferably includes a microprocessor 26 in communication with various computer readable storage media 28 via data and control bus 30. Computer readable storage media 28 may include any of a number of known devices which function as read only memory 32, random access memory 34, and non-volatile random access memory 36.

Computer readable storage media 28 have instructions stored thereon that are executable by controller 22 to perform methods of controlling the internal combustion engine, including variable flow exhaust gas recirculation (EGR) valve 66 and variable geometry turbocharger (VGT) 52. The program instructions are executed by controller 22 in microprocessor 26 to control the various systems and subsystems of the engine and/or vehicle. In addition, various instructions may also be executed by any number of logic units 50. Input ports 38 receive signals from various sensors, and controller 22 generates signals at output ports 24 that are directed to the various engine and/or vehicle components.

A data, diagnostics, and programming interface 44 may also be selectively connected to controller 22 via a plug 46 to exchange various information therebetween. Interface 44 may be used to change values within the computer readable storage media 28, such as configuration settings, calibration variables, instructions for EGR and VGT control and others.

In operation, controller 22 receives signals from the various engine/vehicle sensors and executes control logic embedded in hardware and/or software to control the engine. In a preferred embodiment, controller 22 is the DDEC controller available from Detroit Diesel Corporation, Detroit, Mich. Various other features of this controller are described in detail in a number of U.S. patents assigned to Detroit Diesel Corporation. Control logic may be implemented in hardware, firmware, software, or combinations thereof. Further, control logic may be executed by controller 22, in addition to by any of the various systems and subsystems of the vehicle cooperating with controller 22. Further, although in a preferred embodiment, controller 22 includes microprocessor 26, any of a number of known programming and processing techniques or strategies may be used to control an engine in accordance with the present invention.

With continuing reference to FIG. 1, controller 22 provides enhanced engine performance by controlling a variable flow exhaust gas recirculation valve 66 and a variable geometry turbocharger (VGT) 52. VGT 52 includes a turbine 54 and a compressor 56 mounted on a common shaft 57. The pressure of the engine exhaust gasses causes the turbine to spin which in turn drives the compressor. The spinning compressor creates turbo boost pressure which develops increased power during combustion.

A variable geometry or variable nozzle turbocharger has moveable components in addition to the rotor group. These moveable components can change the VGT geometry by changing the area or areas in the turbine stage through which exhaust gasses from the engine flow, and/or changing the angle at which the exhaust gasses enter or leave the turbine. Depending upon the VGT geometry, the VGT supplies varying amounts of turbo boost pressure to the engine. The VGT geometry may be electronically controlled to vary the amount of turbo boost pressure based on various operating conditions.

In a typical VGT, the turbine housing is oversized for an engine, and the air flow is choked down to the desired level. There are several designs for the VGT. In one design, a variable inlet nozzle has a cascade of moveable vanes which are pivotable to change the area and angle at which the airflow enters the turbine wheel. In another design, the VGT has a moveable side wall which varies the effective cross-sectional area of the turbine housing. In general, the airflow through the turbine, and hence the turbine speed and resultant boost pressure at the compressor outlet, are controlled by varying the geometry of the VGT. It is appreciated that embodiments of the present invention are not limited to any particular structure for the VGT. That is, the term VGT or VNT as used herein means any controllable air pressurizing device including the above examples, and including a modulated waste gate valve.

An exhaust gas recirculation (EGR) system selectively introduces a metered portion of the exhaust gasses into the intake manifold 69. The EGR system dilutes the incoming fuel charge and lowers peak combustion temperatures to reduce the amount of oxides of nitrogen produced during combustion. The amount of exhaust gas to be recirculated is controlled by EGR valve 66 and VGT 52. In accordance with the present invention, the EGR valve is a variable flow valve that is electronically controlled by controller 22. The geometry of the VGT is also electronically controlled by controller 22. There are many possible configurations for a controllable EGR valve and embodiments of the present invention are not limited to any particular structure for the EGR valve.

As mentioned previously, various sensors are located throughout the engine to provide feedback to controller 22. An engine intake manifold temperature sensor 70 monitors the temperature of the gas mixture entering the engine. An EGR differential pressure sensor 72 and EGR temperature sensor 74 allow the controller to determine the mass flow rate through the EGR valve. Boost pressure sensor 76 provides the controller with a measurement of the boost pressure provided by the VGT compressor, while compressor outlet temperature sensor 78 provides feedback of the temperature of the airflow leaving the VGT compressor. Compressor inlet temperature sensor 80 measures the temperature of the airflow entering the VGT compressor. Turbo speed sensor 82 measures the rotational speed of the VGT turbine shaft. Barometric pressure sensor 84 measures the ambient pressure. In addition, it is appreciated that various different sensor configurations may be utilized in various parts of the exhaust flow paths to allow controller 22 to determine the various mass flow rates throughout the exhaust system, including flow through the EGR system and flow through the compressor, etc. depending on the particular application.

In some embodiments, it may be desirable to provide a cooler 62 to cool the charge air coming from compressor 56. Similarly, in some embodiments, it may be desirable to provide a cooler 68 to cool the flow through the EGR system prior to reintroduction into the intake manifold 69 of engine 12 to further reduce peak combustion temperatures and the production of nitrogen oxides.

Embodiments of the present invention include control logic that processes various inputs representing various engine conditions, and in turn, provides an EGR command signal and a VGT command signal. The EGR command signal commands a position for the variable flow EGR valve 66 to control gas flow through path 64, while the VGT command signal commands a geometry for VGT 52 to control gas flow through path 60. The controller 22 may operate in one of at least two control modes. In EGR control mode, the controller 22 attempts to actuate the geometry of the VGT 52 to provide the desired EGR flow rate. In boost control mode, the controller 22 attempts to actuate the geometry of the VGT 52 to provide the desired boost pressure.

Auto calibration is a method where the engine control computer records the output of the EGR DPS under conditions where it known that there is no EGR flow. Under these conditions the sensor output should reflect zero differential pressure. The engine control computer records the amount of error in the measurement, then applies a correction factor across the engine pressure range of the sensor to compensate for this error. If the observed error is large enough, the computer determines that the sensor is failed, and a fault code is logged.

To assure that this compensation is accurate and consistent, the process is controlled to account for the following factors:

(1) Zero EGR flow: The sensor must be observed when there is no egr flow. The best way to assure this is with the engine not running (RPM=zero).

(2) Temperature: The sensor is most accurate when it is at its stable operating temperature. It is less accurate when it is at temperature extremes. The sensor error itself can change while the sensor temperature is changing and unstable. It is not desirable to perform the auto calibration while the sensor is at temperature extremes or when the sensor temperature is not stable.

(3) Fluid contamination: in one implementation of the sensor, the differential pressure is fed to the sensor using two separate tubes from the differential pressure device. These devices can fill with fluid after the engine is shut down for a period of time. When the engine is re-started, this fluid in the tubes can cause errors in the differential pressure reading from the sensor. It is not desirable to perform the auto calibration while this condition exits.

(4) Frequency: One implementation of auto calibration occurs when the ignition key is turned on but the engine is not started. This condition does not occur often enough in normal truck driving cycles for auto calibration to be effective.

(5) Unusual engine operating states: To avoid errors it is desirable to avoid auto calibration when the engine is in an engine shutdown from unusual events such as engine protection or idle shutdown.

Auto calibration of an engine sensor according to the present invention is conducted when conditions are controlled to assure that the compensation is accurate and repeatable. To assure that there is no EGR flow, auto calibration is allowed when the engine has gone from the running state (RPM>0) to the non-running state (RPM=0) by way of the operator turning the engine ignition off. To assure that the sensor is at a constant temperature, and that it is at its operating temperature, auto calibration is only allowed when the engine coolant temperature is above a pre-determined value. To assure that there is no fluid in the tubes connected to the sensor, auto calibration is only allowed if the engine has been running for a pre-set amount of time. This provides time for any fluid to evaporate or shake out of the tubes. To assure that there is no fluid in the tubes connected to the sensor, auto calibration in only allowed when the engine coolant temperature is above a pre-determined value. This elevated temperature helps to burn off any trapped fluid. To assure that auto calibration occurs frequently enough to be useful, auto calibration occurs when the ignition signal goes from the ON state to the OFF state. During most key off shut downs, the engine temperature and engine run time criteria will be met, and auto calibration with occur at an almost daily frequency. To assure that auto calibration occurs under predictable conditions, in one implementation, auto calibration is not allowed if the engine was shut down due to an engine protection or idle shutdown function. To assure that auto calibration occurs under predictable conditions, in one implementation, auto calibration is only allowed if engine RPM has gone from non-zero to zero after the operator turns the ignition off.

Analog features can be referenced either by their PID or by their analog function number. The analog channels information is non-volatile which is stored in the calibration section. During every start-up process the calibration information is copies from flash memory to ream and during the shut down process the updated information will be copies back to flash memory.

Analog input information in available through the global structure analog_values (from include/external h) which is an array indexed by symbolic function name called an 'anum'; the anum for EGR delta pressure is AN_EGR_DELTA_P. (The anum can also be determined by accessing the AV_anum_from_pid array using 411 as the index).

The process_analog_values function in the analog value processing module (avp) periodically processes and updates value on every analog channel at an interval of 25 ms. The current auto-calibration procedure resides in this function. It goes through the calibration procedure whenever the current auto-calibration conditions are met, otherwise it just updates the EGR delta pressure value at every timer tick. This function also checks if the readings of analog channels are out of their raw high and low limits and log faults accordingly.

Each analog channel is configured by a calibration structure with the following fields:

| | |
|---|---|
| a_rawlolimit | Value below which the raw value is considered to be out of range |
| a_rawhilimit | Value above which the raw value is considered to be out of range. |

Each analog value is defined by its entry in the analog values array has the following fields:

| | |
|---|---|
| raw_value | The A/D counts for the cannel |
| processed_value | Scaled value used in the lead-lag filter |
| physical_cannel | The number of the physical channel; negative if no physical channel |
| data_received | Boolean flag set to true if the physical channel is not configured and a value for processed_value has been received over a comms link. |
| faults_valid | Flag set to true when at least one successful A/D conversion has taken place this ignition cycle. |
| sensor_fault_detected | Set to TRUE if either of the fault codes (FMI's 3 and 4) that reflect the status of the sensor_fail_XXX bits are valid |
| scaled_fail_high | Boolean flag; true if fault state exists. |
| scaled_fail_low | Boolean flag; true if fault state exists |
| sensor_fail_high | Boolean flag; true if fault state exists |
| sensor_fail_low | Boolean flag; true if fault state exists |
| converted | Boolean flag set to true if the value was converted during the most receive hardware read cycle |
| a_offset | signed offset to add to (filtered) raw values before scaling |

This feature adds an exclusion condition for seven existent fault codes (SID 146-FMI 2 [Req. 3], SID 146-FMI 12 [Req 4], SID 146-FMI 7 [Req 5], SID 147-FMI 7 [Req. 6], SID 147-FMI 14 [Req. 7], PID 411-FMI 0 [Req. 8] and PID 411-FMI 1 [Req. 9]) to limit the number of fault occurrences. Note that none of these faults has an exclusion, so only one new exclusion code is needed. There is one exclusion condition among the properties of the fault structure, which can be set to a particular number (31). The calculate_exclusions function in the fault module to set the pre-defined exclusion condition (prevent loggin fault whenever analog_values [AN_ COOL_TEMP] processed_value. Ramcal.egr_fault_min_clnt_temp for a time less than egr_fault_min_hot minutes) according to the number. In the feature design we can just define a new exclusion number, increment MAX_EXCULSIONS in faults m, replace the original exclusion number in the fault control table structure with the newly defined exclusion number and finally add the exclusion condition as new entry in the exclusion_table in the calculate_exclusions function.

A new option for EGR auto-calibration gives the flexibility to reduce service cost when installing new EGR delta pressure sensor and deactivate active fault code detected in previous ignition cycles. This feature requires a new J1587 proprietary ID (ID 15) [Req. 10] with other conditions to invoke the auto-calibration procedure. After the DDEC has received the ID 15 it should return an existent J1587 proprietary ID (ID 140) with correspondent information to inform the service technician what the current status is. In the process_analog_value function of avp.c module, the current auto-calibration procedure resides under case AN_EGR_DELTA_P. The forced auto-calibration procedure can be added in as a new else if branch, and the current calibration algorithm can be used in this branch with some simplifications because the engine speed is zero in this branch. The feature is best described by the following pseudo-code:
Case AN_EGR_DELTA_P:
  /*
    * If auto-calibration enabled and processed
    * coolant temperature is not less than
    * dp_autocal_min_clnt_temp perform
    * auto-recalibration logic
  */

If ((ramcal.dp_autocal_enable) and
  (analog_values[AN_COOL_TEMP]. processed_value>=
  Ramcal.dp_autocal_min_clnt_temp)) IHEN
    Current auto-calibration logics
ELSE IF ((!GL_ecm_powerdown_started && engine_rpm=0) [Req. 11] and
Ramcal.dp_autocal_enable [Req. 12] and
  GL_j1587_id15_received) THEN
  /* Forced Auto-calibration Mode,
    GL_j1587_id15_received is a new Global variable, set when ID15 received
  */
  Go through the autocal procedure with only the engine speed=0 case
  IF (Dp_zero_error>=(ramcal.dp_zero_max<<8)) THEN
    DP_zero_error=(ramcal.dp_zero_max<<8);
    GL_dep_out_of_calib=TRUE; /* log pid 411 fmi 13 fault
    , this fault will be latched across ignition cycles */
    GL_force_boost_diag=TRUE; /* force to go to boost mode
    */
  ELSE IF (Dp_zero_error<=(ramcal.dep_zero_min<<8)) THEN
    Dp_zero_error=(ramcal.dp_zero_min<<8);
    GL_dp_out_of_calib=TRUE;
    GL_force_boost_diag=TRUE; [Req. 26]
  ELSE
    GL_dp_out_of_calib=FALSE;
    GL_force_boost_daig=FALSE;
  END IF
  /* set offset */
  Dp_zero_offset=−DP_zero_error;
  /* 0 rbp=((8rbp+rbp)*7rpb)>>15)*/
  fl_value=(((fl_value+dp_zero_offset)*
    ca p->a gain)+16384)>>15);
  /* update av_p */
  /* at this point fl_value is always positive */
  av p->processed value=(UNS32) fl_value;
  GL_j1587_id15_received=FALSE:
END ELSE IF
A new action function action_invoke_delta_p_autocal which will declare ID__15 received and output ID__140 with appropriate parameters shall be added along with other 'action.' functions in ddec.c mode. This can be described as the following pseudo-code:
Action_invoke_delta_P_autocal( )
  IF (engine_RPM=0 and dp_autocal_enable=TRUE) IHEN
    Set GL_j1587_id15_received no true
    Conditional response(*input_ptr, CR_ACKNOWLEDGE) [Req. 13]
  ELSE IF (engine_rpm!=0) THEN
    Conditional_response(*input_ptr,
      CR_ENGINE_RUNNING) [Req. 14]
  ELSE IF (dp_auto_enable=FALSE) THEN
    Conditional_response (*input_ptr, CR_NOI_ALLOW_BY_CAL) [Req. 15]
  END IF
Yet another option for EGR delta pressure auto-calibration method shall be implanted to provide an easy way to accomplish the auto-calibration procedure. In this case the engine will run a certain amount of time to reach the calibratable time (dp_autocal_key_off_min_run_time) and then ignition will be switched off for another calibratable period (dp_autocal_key_off_delay), then the auto-calibration procedure starts if the engine shutdown is not caused by idle shutdown or engine protection shutdown procedures. If ECM goes into this calibration mode, the ECM should stay awake until the procedure finished and autocal data has been written into non volatile memory. When EGR delta pressure counts exceeds the calibratable limits (less than dp_zero_min or greater than dep_zero_max, a fault should be latched throughout ignition cycles until it is cleared by next auto-calibration procedure when it is within the range.

The auto-calibration section of this feature shall be designed as another 'else if' branch in the avp module under case AN_EGR_DELTA_P. The same auto-calibration logic will be used also in this branch. To ensure the ECM stay awake during the auto-calibration period, a global variable (GL_dep_autocal_is_done) is created to communicate the status of the calibration process with the mps module. In the shutdown process the mps module will only go to next level (from MPS_WAIT_NO_IRS to MPS_WRITING_NV_1ST) after perceiving the auto-calibration has completed. The following auto-calibration procedure pseudo-code in avp module can better describe the implementation.

```
ELSE IF (dp_autocal-key_off_enable) THEN
    /* see if can go into Engine Shutdown Auto-calibration
       mode */
    IF (engine_run_timer) THEN
        IF (engine_RPM>0) THEN
            engine_run_timer--; /* engine run timer set to
        END IF /* dp_autocal_key_off_min_run_time
    ELSE
        IF (ignition_switch_old and GL_ecm_powerdown_
            started) IHEN
            ignition_switch_on_to_off_occurred=TRUE; [Req.
                28]
        END IF
        Ignition_switch_old-!GL_ecm_powerdown_started;
        IF (ignition_switch_on_to_off_occurred and
            (engine_rpm=0) and
            (!EP_idle_shut_occurred) and/* No idle shutdown
                occur
            (!EP_engp_shut_occurred)) THEN /*No engp shut-
                down
            IF (engine_stop_timer) THEN
                engine_stop_timer--;/* dep_autocal_key_off_delay
                GL_dp_autocal_is_done=FALSE:
            ELSE
            /* Enters Engine Shutdown Auto-calibration mode */
                Go through the autocal procedure with only the
                    engine speed=0 case
                IF      (Dp_zero_error>=(ramcal.dp_zero_max<<8))
                    THEN
                    Dp_zero_error=(ramcal.dep_zero_max<<8);
                    GL_dp_out_of_calib=TRUE; /* log pid 411 fmi 13
                fault, this fault will be latched across ignition cycles
                */
                    GL_force_boost_diag=TRUE; '/* force to go to boost
                        mode */
                ELSE IF (Dp_zero_error<=(ramcal.dp_zero_min<<8))
                    THEN
                    Dp_zero_error=ramcal.dp_zero_min<<8);
                    GL_dp_out_of_calib=TRUE;
                    GL_force_boost_diag=TRUE;
                ELSE
                    GL_ep_out_of_calib=FALSE;
                    GL_force_boost_diag=FALSE;
                END IF
                /* set offset */
                Dp_zero_offset=-Dp_zero_error;
                    /* 0 rbp=((8rbp+8rbp)*7rbp)>>15) */
                fl_value=(((fl_value+dp_zero_offset) *
                    ca_p->a_gain)+16384)>>15);
                /* update av_p */
                /* Orbp=0rbp */
                /* at this point fl_value is always positive */
                av_p->processed_value=(UN32) fl_value;
                GL_dp_autocal_is_done=TRUE;
            END IF /* end if engine stop timer */
        END IF /* end of ignition switch old */
    END IF /* end if engine run times */
END IF /* end of Engine Shutdown Auto-calibration Mode */
```

Figure 2:
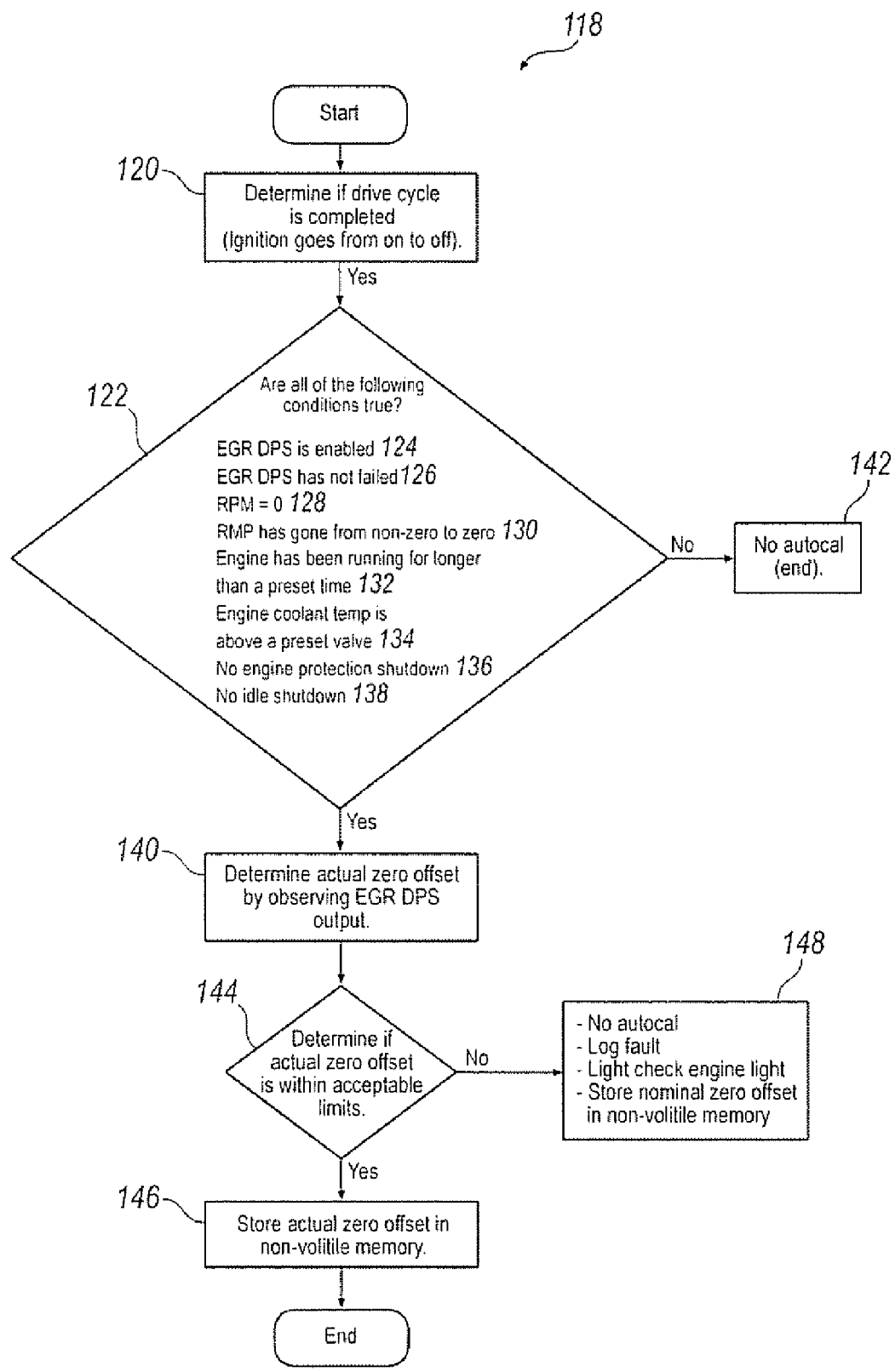
FIG. 2 is a schematic representation of a software flow chart depicting one method of the present invention.

FIG. 2 is a schematic representation of a software flow chart of one method to auto calibrate an EGR differential pressure sensor.

Method 118 begins at step 120, which is determining whether the drive cycle is completed. In this regard, it is equally useful to use the status of the engine ignition to determine whether the drive cycle is completed. For example, it may be useful to determine that the ignition has gone from on to off position. If the drive cycle is complete (i.e., the ignition goes from on to off).

Step 122 is a series of simultaneous determinations, all of which must be made under normal engine operation in order to auto calibrate the EGR differential pressure sensor. Step 124 is determining whether the EGR differential pressure sensor is enabled. Step 126 is determining whether the EGR differential pressure sensor is failed. Step 128 is determined whether engine speed is zero. Step 130 is determining whether the engine speed has gone from non zero to zero. Step 132 is determining whether the engine has been running for longer than a calibratable preset time. Step 134 is determining whether engine coolant temperature is above a calibratable predetermined value. Step 136 is determining whether there is any engine protection shutdown and step 138 is checking if the engine is in idle shutdown. Steps 122 through 138 may collectively be called determination of engine operating status.

Under normal engine operation, if the determining of all the engine operation status of step 124 through 138 are all yes, then step 140 is determining the actual zero effect by activating the EGR differential pressure sensor output. If any determination of step 124 through 138 is no, then step 142 states no auto calibration occurs and the process ends.

Once step 140 is completed, step 144 is determine whether the actual zero offset is within acceptable limits, as set forth above. If yes, then step 146 is storing the actual zero offset in nonvolatile memory. If no, then step 148 is no auto calibration logging a fault, activating a warning alert and storing nominal zero offset in nonvolatile memory. Generally, a fault will not be logged until it occurs some predetermined number of times. This may be achieved by setting a counter to debounce EGR fault codes.

Required Parameters:
auto cal enable (yes no)
auto cal at key off (yes no)
auto cal min coolant temp
auto al min run time
dp zero min
dp zero max
There are three cases for auto cal (at key on, key off, or forced by took)

Auto cal at idle is not allowed and should be disabled in the software.
1) Key On:
   i. Perform auto cal if:
   ii. auto cal enable=1
   iii. auto cal at key off=0
   iv. Ignition is on
   v. RPM=0
   vi. coolant temp>auto cal min coolant temp
   vii. egr dp sensor is not failed (counts within rawlo and rawhi limits)
2) Key Off
Perform auto cal if:
   i. auto cal enable=1
   ii. auto cal at key off=1
   iii. ignition just went from on to off
   iv. RPM=0
   v. coolant temp>auto cal min coolant temp
   vi. engine run time>auto cal min run time
   vii. egr dp sensor is not failed (counts within rawlo and rawhi limits)
   viii. not an engine protection or idle shutdown
3) Forced by tool
Perform auto cal if:
   i. auto cal enable=1
   ii. auto cal at key off=does 0not matter
   iii. Ignition is on
   iv. RPM=0
   v. command received from tool
   vi. coolant temp does not matter
   vii. engine run time does not matter
   viii. egr dp sensor is not failed (counts within rawlo and rawhi limits)
AUTO CAL LOGIC
When one of the conditions 1 thru 3 above is satisfied
   i. wait long enough for the signal to settle
   ii. record the egr dp sensor counts
   iii. if dp counts are within dp zero min and dp zero max then compute the egr delta P pressure using this new zero offset
If dp counts are outside dp zero min and dp zero max
   i. generate the active fault PID 411 FMI 13 "Egr delta p sensor out of calibration"
   ii. force the engine into boost mode (shut off EGR mode)
   iii. *set the delta P sensor error back to zero, in other words, do not compensate the sensor for the detected error.
   iv. This fault is to remain active during the current and subsequent ignition cycles until a successful auto cal is performed (then it becomes inactive)

*This assures that when a technician looks at the sensor reading key on the engine off, he will observe the large delta P offset in kpa/"h2o. He can then easily verify the failure.

While the invention is described as stated, the words used are words of description, not words of limitation. Those skilled in the art recognize that various modifications may be made without departing from the scope or spirit of the invention as set forth in the appended claims.

What is claimed as new and desired to be protected by Letters Patent of the United States is:

1. A method for operating an electronic controlled internal combustion engine with an electronic control unit (ECU) having at least nonvolatile memory and tables resident therein to automatically recalibrate an exhaust gas recirculation (EGR) differential pressure sensor:
   determining whether a drive-cycle is completed;
   simultaneously determining engine status, EGR differential pressure sensor status, engine coolant temperature;
   determining actual zero offset by observing EGR differential pressure sensor output;
   determining whether actual zero offset is within acceptable limits; and
   storing actual zero offset in nonvolatile memory.

2. The method of claim 1, wherein said drive cycle is determined by an ignition stature going from on to off.

3. The method of claim 1, wherein said EGR status is determining whether said EGR differential pressure sensor is enabled and whether said EGR differential pressure sensor is not fixed.

4. The method of claim 1, wherein said engine status includes simultaneously determining whether said engine has run a predetermined calibratable period of time; whether engine speed has gone from non zero to zero, and whether engine speed remains zero for a predetermined calibratable period of time.

5. The method of claim 4, further including determining whether engine shut down protection and idle shut down programs are operating.

6. The method of claim 1, further including no auto calibration of said EGR differential pressure sensor, logging a fault, actuating a warning alert and storing a minimal zero offset in nonvolatile memory when said actual zero offset is outside predetermined calibratable acceptable limits.

7. The method of claim 5, further including no auto calibration of said EGR Differential pressure sensor if at least one of EGR differential pressure sensor is not enabled or is fixed, engine speed is not zero, engine speed has not gone from non zero to zero, engine has not been running longer than a preset time, engine protection shutdown is operating or engine idle shutdown is operating.

8. The method of claim 1 further includes setting a counter in said ECU for debouncing EGR leak fault until said faults occur a predetermined number of times.

9. The method of claim 1, wherein auto calibrating said EGR differential pressure sensor occurs at said drive cycle end.

10. The method of claim 1 further includes performing auto calibration of said EGR differential pressure sensor when engine ignition is on or if auto calibration is enabled, auto calibration at ignition off is disabled, ignition is on, engine speed is zero, coolant temperature is greater than an auto calibrated minimum coolant temperature and said EGR differential pressure sensor is not failed.

11. The method of claim 1, further including
   logging a fault that remains active during current and subsequent drive cycles until a successful auto calibration of said EGR differential Pressure Sensor occurs.

12. The method of claim 1, further including auto calibrating said EGR Differential Pressure Sensor in response to a command from a service tool when said ignition is on, a command is reviewed by the ECU from a service tool to auto calibrate said EGR differential pressure sensor engine speed is zero and said EGR differential pressure sensor has not failed.

13. The method of claim 1, further including determining whether EGR differential pressure sensor voltages are within a differential pressure zero minimum and a differential pressure maximum to compute the EGR differential pressure.

14. The method of claim 13, further including generating an active fault, shutting off EGR engine operation mode and setting the EGR differential pressure sensor error back to zero when the differential pressure counts are outside a differential pressure zero minimum and differential pressure zero maximum range.

15. The method of claim 1, further including operating the engine in boost mode when a fault is logged.

* * * * *